(12) United States Patent
Pérez Rico et al.

(10) Patent No.: US 11,907,765 B2
(45) Date of Patent: Feb. 20, 2024

(54) FOG COMPUTING SYSTEMS AND METHODS

(71) Applicants: BARCELONA SUPERCOMPUTING CENTER—CENTRO NACIONAL DE SUPERCOMPUTACIÓN, Barcelona (ES); UNIVERSITAT POLITÈCNICA DE CATALUNYA, Barcelona (ES)

(72) Inventors: Juan Luís Pérez Rico, Barcelona (ES); Alberto Gutiérrez Torre, Barcelona (ES); Josep Lluís Berral García, Barcelona (ES); David Carrera Perez, Barcelona (ES)

(73) Assignees: BARCELONA SUPERCOMPUTING CENTER—CENTRO NACIONAL DE SUPERCOMPUTACIÓN, Barcelona (ES); UNIVERSITAT POLITÈCNICA DE CATALUNYA, Barcelona (ES)

( * ) Notice: Subject to any disclaimer, the term of this patent is extended or adjusted under 35 U.S.C. 154(b) by 662 days.

(21) Appl. No.: 17/050,368

(22) PCT Filed: Jul. 6, 2018

(86) PCT No.: PCT/EP2018/068367
§ 371 (c)(1),
(2) Date: Oct. 23, 2020

(87) PCT Pub. No.: WO2019/206436
PCT Pub. Date: Oct. 31, 2019

(65) Prior Publication Data
US 2021/0117758 A1    Apr. 22, 2021

(30) Foreign Application Priority Data
Apr. 26, 2018  (EP) .................................. 18382285

(51) Int. Cl.
*G06N 3/08* (2023.01)
*G06F 9/50* (2006.01)
(Continued)

(52) U.S. Cl.
CPC .......... *G06F 9/5072* (2013.01); *G06F 18/214* (2023.01); *G06N 3/044* (2023.01);
(Continued)

(58) Field of Classification Search
CPC ..... G06F 9/5072; G06F 18/214; G06N 3/045; G06N 3/044; G06N 3/063; G06N 3/08; H04L 67/1089; H04L 67/125
See application file for complete search history.

(56) References Cited

U.S. PATENT DOCUMENTS

2016/0253394 A1* 9/2016 Eliás ...................... H04L 67/12
707/719
2017/0300693 A1* 10/2017 Zhang ................... G06F 21/566
(Continued)

FOREIGN PATENT DOCUMENTS

WO    WO2017/035536 A1    3/2017

OTHER PUBLICATIONS

International Search Report and Written Opinion dated Jan. 24, 2019 for International Patent Application No. PCT/EP2018/068367, 18 pages.
(Continued)

*Primary Examiner* — Syed Haider
(74) *Attorney, Agent, or Firm* — SQUIRE PATTON BOGGS (US) LLP

(57) ABSTRACT

Fog computing systems are provided comprising edge-nodes and middle-nodes between edge-nodes and cloud-node. These nodes form a hierarchical structure with each cloud, middle node having children nodes, and each middle, edge node having a parent-node. Each edge-node receives
(Continued)

data from sensors, assigns reception-timestamp to each data indicating when data has been received to produce series of timestamp-ordered data, trains local model through machine-learning based on said series of timestamp-ordered data, and sends said series to parent-node of the edge-node. Each middle-node collects series of timestamp-ordered data from children nodes of the middle-node, trains supra-local model through machine-learning based on said collected series of timestamp-ordered data, and sends said collected series to parent-node of the middle-node. Parent-children structures, edge-nodes and middle-nodes for such fog computing systems are also provided. Methods and computer programs of operation of an edge-node, and methods and computer programs of operation of a middle-node are also provided.

20 Claims, 5 Drawing Sheets

(51) Int. Cl.
*G06N 3/063* (2023.01)
*H04L 67/1087* (2022.01)
*H04L 67/125* (2022.01)
*G06F 18/214* (2023.01)
*G06N 3/045* (2023.01)
*G06N 3/044* (2023.01)

(52) U.S. Cl.
CPC ............ *G06N 3/045* (2023.01); *G06N 3/063* (2013.01); *G06N 3/08* (2013.01); *H04L 67/1089* (2013.01); *H04L 67/125* (2013.01)

(56) References Cited

U.S. PATENT DOCUMENTS

| 2018/0032908 | A1 | 2/2018 | Nagaraju et al. |
| 2018/0109428 | A1* | 4/2018 | Kattepur ................. H04W 4/70 |
| 2018/0176317 | A1* | 6/2018 | Hwang ................... H04L 67/34 |
| 2018/0227199 | A1* | 8/2018 | Liu ......................... H04L 69/18 |
| 2019/0312898 | A1* | 10/2019 | Verma .................... G06N 5/022 |

OTHER PUBLICATIONS

Teerapittayanon, et al: "Distributed Deep Neural Networks Over the Cloud, the Edge and End Devices", Proceedings of the International Conference on Distributed Computing Systems, IEEE Computer Society, US, Jun. 5, 2017 (Jun. 5, 2017), pp. 328-339, XP033122945, ISSN: 1063-6927, DOI:10.1109/ICDCS.2017.226.

Tang, et al: "A Hierarchical Distributed Fog Computing Architecture for Big Data Analysis in Smart Cities", ASE BD&SI Oct. 7-9, 2015; Kaohsiung, Taiwan; pp. 1-6, XP58075673A; DOI 10.1145/2818869.2818898.

* cited by examiner

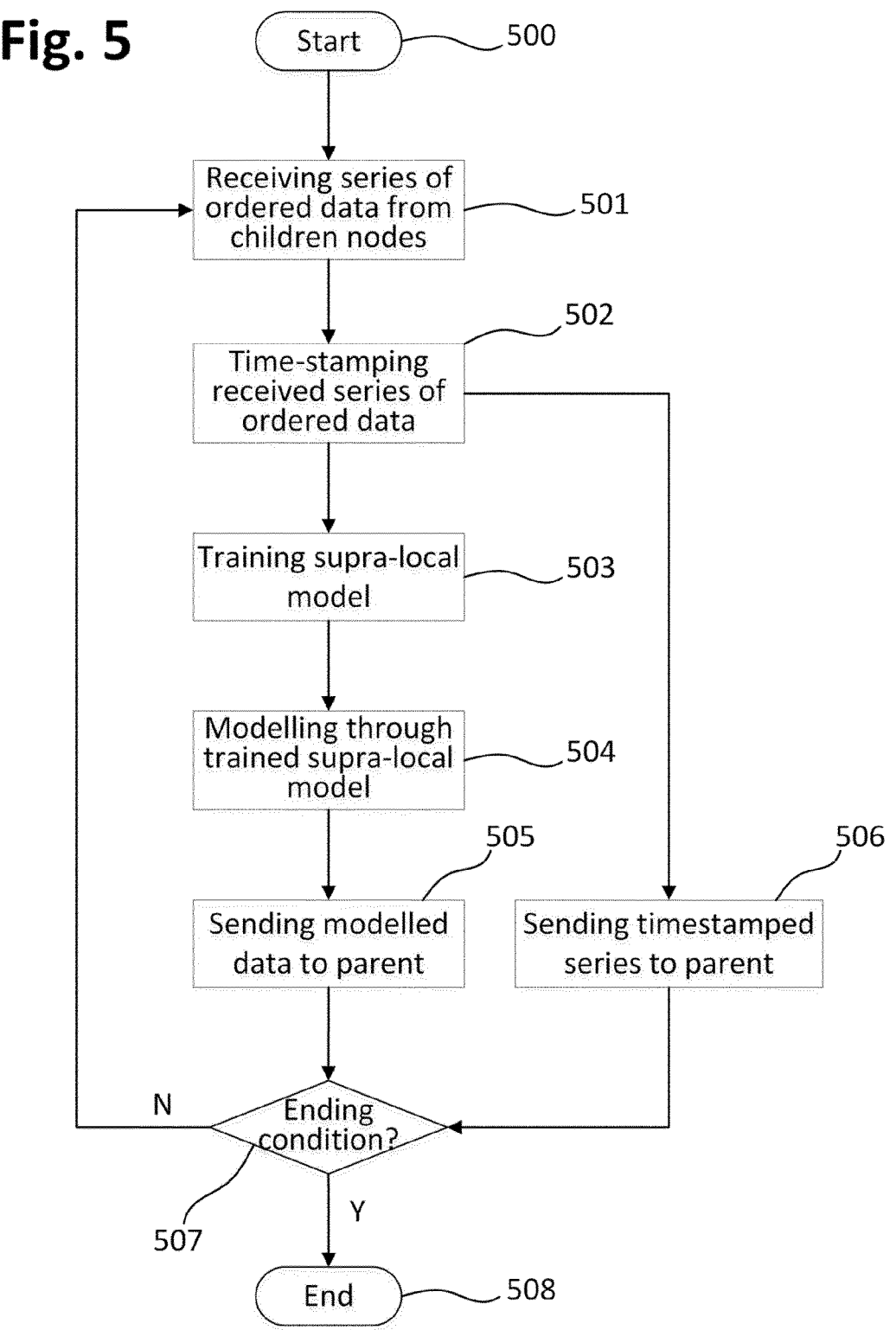

FOG COMPUTING SYSTEMS AND METHODS

CROSS-REFERENCE TO RELATED APPLICATIONS

This application is a national-stage filing under 37 USC 371(c) of International Application No. PCT/EP2018/068367, filed Jul. 6, 2018, which claims the benefit of European Patent Application EP18382285.7, Apr. 26, 2018, the entire contents of each of which are herein incorporated by reference in their entirety for all purposes.

The present disclosure relates to fog computing systems and to parent-children structures, edge nodes and middle nodes usable (or included) in such fog computing systems. The present disclosure further relates to methods and computer programs of operation of an edge node usable (or included) in such fog computing systems, and to methods and computer programs of operation of a middle node usable (or included) in such fog computing systems.

BACKGROUND

Several technologies relevant to the expansion of the Internet of Things (IoT) have emerged in the last years, including network functions virtualization (NFV), fifth generation (5G) wireless systems, and Fog computing. The combination of these technologies opens a new range of potential applications in the context of Smart Cities.

There is a fast growth in the number of projects planning to deliver new services to citizens, based on the deployment of a large number of Fog nodes near the edge, in the streets of modern cities, bridging the gap between devices and Cloud-based services.

Fog nodes may host lightweight services on near real-time, like for instance the collection and processing of streams of data. This technology is a foundational enabler for the future development of advanced services such as for instance traffic monitoring and planning through the combination of street sensors data (e.g. vehicle tracking, air quality measurements) and meteorological information.

Although Fog nodes offer a constrained computing capacity compared to their Cloud counterparts, they still have capabilities to process data in near real-time to provide localized service to users, minimizing the communication requirements with the Cloud, or ensuring application resilience against back-haul connectivity outages between the Fog and Cloud layers or levels.

Modern cities demand new approaches to deliver localized services to their citizens, and at the same time, network operators look for new advanced services that may take advantage of the new hyper-connected society that is expected for the coming 5G era. The incredibly high bandwidth that 5G networks will offer to their users will restrict the possibility to define new services that run only in centralized Cloud-based locations.

An object of the present disclosure is to provide fog computing systems, and parent-children structures, edge nodes and middle nodes for such fog computing systems, and methods and computer programs of operating such edge nodes, and methods and computer programs of operating such middle nodes, so as to improve prior art systems and methods with fog computing purposes or similar nature.

SUMMARY

In an aspect, a fog computing system is provided comprising a plurality of fog nodes including edge nodes at an edge or bottom level, and middle nodes at one or more middle levels intermediating between the edge nodes and a cloud node at a cloud or top level. The cloud and middle nodes are non-bottom nodes, the middle and edge nodes are non-top nodes. These non-bottom and non-top nodes form a hierarchical structure with each of the non-bottom nodes having children nodes at an immediately below level, and each of the non-top nodes having a parent node at an immediately above level.

Each of the edge nodes is configured to perform following functions: receiving sensor data produced by sensors, assigning a reception timestamp to each of said sensor data indicating when sensor data has been received to produce corresponding series of timestamp-ordered sensor data, training a first local model through machine learning based on said series of timestamp-ordered sensor data, and sending said series of timestamp-ordered sensor data upwards to the parent node of the edge node.

Each of the middle nodes is configured to perform following functions: collecting series of timestamp-ordered sensor data from the children nodes of the middle node, training a first supra-local model through machine learning based on the collected series of timestamp-ordered sensor data, and sending the collected series of timestamp-ordered sensor data upwards to the parent node of the middle node.

The proposed fog computing system may provide several benefits in comparison with prior systems. For example, since sensor data, which is "locally" received at the edge nodes, is transmitted upwards in the system from the edge nodes to the cloud node, different (prediction) models may be created and trained depending on the data "propagated" at each fog level. The (prediction) models generated and trained at the edge nodes (first local models) and at the middle nodes (first supra-local models) may permit producing modelled (prediction) data covering different areas and sub-areas to be modelled, tracked. These areas and sub-areas may be predefined according to different criteria, such as e.g. territorial criteria, functional criteria, operational criteria, etc.

With respect to functional criteria, sensor data received at the edge nodes may be provided by sensors installed at devices performing specific types of functions. For example, heater devices may provide corresponding sensor data (e.g. temperature) to a sub-tree of fog nodes of the fog computing system, cooler devices to another sub-tree of fog nodes, air conditioning devices to a further sub-tree of fog nodes, etc. This way, modelled (prediction) data segmented according to different functions and with different granularity levels may be provided by a system such as the ones suggested in present disclosure.

With respect to territorial criteria, sensor data received at the edge nodes may be provided by sensors installed at devices (fixedly or movably) located at particular territorial units. For example, different sets of sensors may be located at different street segments in a city to produce sensor data characterizing said street segment. Sensors located at street segments forming a complete street may provide sensor data to edge nodes with same middle node as parent node. Middle nodes covering complete streets of same district may be configured as children nodes of same middle node at an above level in the fog computing system. And so on. This manner, different models covering (or characterizing) different territorial units: street segment, complete street, district, city, etc. may be trained at corresponding fog levels and, hence, predictions attributable to the different territorial units may be produced.

Analogous considerations to those provided in relation to functional and territorial segmentation may be taken into account in the case of operational segmentation and other types thereof.

Another benefit of the proposed fog computing systems with hierarchical (e.g. tree based) structure may be that computation overloads at certain fog nodes (e.g. edge nodes) may be compensated by suitably distributing computational loads between different fog nodes. Workloads may be (dynamically) redistributed e.g. from more computationally loaded nodes (and/or least powerful nodes) to less computationally loaded nodes (and/or most powerful nodes). A good, optimal balance of computational loads and resources may be achieved under an approach of maximum computational closeness to end users. This clearly represents a paradigm change that improves functional and computational performance in comparison with e.g. cloud centric approaches in which main computational load resides in central cloud servers and, hence, modelled data and prediction functions may result excessively distanced from end users.

The sensors from which the edge nodes (in the fog computing system) receive sensor data may comprise vehicle sensors installed at vehicles circulating within a predefined global area. The sensor data may comprise a presence indicator denoting presence of a vehicle within the predefined global area, and speed data representing a speed at which a vehicle is circulating within the predefined global area. A traffic prediction system may be provided including a fog computing system as described before. This approach may be very useful in e.g. smart cities where dense traffic needs to be accurately predicted and managed depending on said predictions. Details about this application are provided in other parts of the description.

In a further aspect, a parent-children structure may be provided which is usable (or included) in a fog computing system such as the one described above. This parent-children structure includes a parent node and a plurality of children nodes of said parent node. Each child node in the children nodes is usable (or included) in the fog computing system as an edge node and the parent node is usable (or included) in the fog computing system as a middle node.

Each child node in the children nodes is configured to receive sensor data produced by sensors, to assign a reception timestamp to each of said sensor data indicating when sensor data has been received so as to produce corresponding series of timestamp-ordered sensor data, to train a first local model through machine learning based on said series of timestamp-ordered sensor data, and to send said series of timestamp-ordered sensor data upwards to the parent node.

The parent node is configured to collect series of timestamp-ordered sensor data from the children nodes, to train a first supra-local model through machine learning based on the collected series of timestamp-ordered sensor data, and to send the collected series of timestamp-ordered sensor data upwards to a parent of the parent node.

This parent-children structure is suitable for (or usable in or included in) fog computing systems such as the above ones. Hence, same or similar principles and benefits as those generally commented in relation to fog computing systems may also apply to these parent-children structures.

In a still further aspect, an edge node is provided which is usable (or included) in a fog computing system such as the one previously described. This edge node is configured to receive sensor data produced by sensors, to assign a reception timestamp to each of said sensor data indicating when sensor data has been received so as to produce corresponding series of timestamp-ordered sensor data, to train a first local model through machine learning based on said series of timestamp-ordered sensor data, and to send said series of timestamp-ordered sensor data upwards to a parent node of the edge node.

This edge node is suitable for (or usable in or included in) fog computing systems such as the previous ones. Hence, same or similar principles and benefits as those generally commented in relation to fog computing systems may also apply to these edge nodes.

In a yet further aspect, a middle node is provided which is usable (or included) in a fog computing system such as the one defined above. This middle node is configured to collect series of timestamp-ordered sensor data from children nodes of the middle node, to train a first supra-local model through machine learning based on the collected series of timestamp-ordered sensor data, and to send the collected series of timestamp-ordered sensor data upwards to a parent node of the middle node.

This middle node is suitable for (or usable in or included in) fog computing systems such as the previous ones. Hence, same or similar principles and benefits as those generally commented in relation to fog computing systems may accordingly apply to these middle nodes.

In an additional aspect, a method is provided of operating an edge node usable (or included) in a fog computing system such as the one previously described. The method comprises receiving, by or at the edge node, sensor data produced by sensors, and assigning, by or at the edge node, a reception timestamp to each of said sensor data indicating when sensor data has been received. The method further comprises producing, by or at the edge node, corresponding series of timestamp-ordered sensor data from the timestamped sensor data, and training, by or at the edge node, a first local model through machine learning based on said series of timestamp-ordered sensor data. The method still further comprises sending, by or at the edge node, said series of timestamp-ordered sensor data upwards to the parent node of the edge node.

In a further additional aspect, a computer program is provided comprising program instructions for causing a computing system to perform the previous method of operation of an edge node usable (or included) in the previous fog computing system. The computing system may be (or may be comprised in) the edge node. The computer program may be embodied on a storage medium and/or carried on a carrier signal.

The above methods and computer programs of operating an edge node are suitable for (or performable or executable by/at) edge nodes such as the ones previously suggested. Hence, same or similar principles and advantages as those attributed to edge nodes may be analogously considered for these methods and computer programs of operating an edge node.

In a furthermore aspect, a method is provided of operating a middle node (usable or included) in a middle level of a fog computing system such as the one defined before. The method comprises collecting, by or at the middle node, series of timestamp-ordered sensor data from the children nodes of the middle node. The method further comprises training, by or at the middle node, a first supra-local model through machine learning based on the collected series of timestamp-ordered sensor data. The method still further comprises sending, by or at the middle node, the collected series of timestamp-ordered sensor data upwards to the parent node of the middle node.

In a still furthermore aspect, a computer program is provided comprising program instructions for causing a computing system to perform the previous method of operation of a middle node usable (or included) in the previous fog computing system. The computing system may be (or may be comprised in) the middle node. The computer program may be embodied on a storage medium and/or carried on a carrier signal.

The above methods and computer programs of operating a middle node are suitable for (or performable or executable by/at) middle nodes such as the ones previously proposed. Hence, same or similar principles and advantages as those attributed to middle nodes may be correspondingly taken into account for these methods and computer programs of operating a middle node.

In some examples, a method may be provided of operation of a parent-children structure usable (or included) in a fog computing system such as the one defined above. This method may comprise, for/at each of the children/edge nodes in the parent-children structure, the above method of operating an edge node and, for/at the parent/middle node in the parent-children structure, the above method of operating a middle node. A computer program may also be provided implementing said method of operation of a parent-children structure.

According to examples, a method may be provided of operation of a fog computing system such as the one described before. This method may comprise, for/at each of the edge nodes in the fog computing system, the above method of operating an edge node and, for/at each of the middle nodes in the fog computing system, the above method of operating a middle node. A computer program may also be provided implementing said method of operation of a fog computing system.

These and other advantages and features will become apparent in view of the following detailed description and drawings.

BRIEF DESCRIPTION OF THE DRAWINGS

Non-limiting examples of the present disclosure will be described in the following, with reference to the appended drawings, in which:

FIG. 5 is a flow chart schematically illustrating a method of operation of a middle node according to examples.

DETAILED DESCRIPTION OF EXAMPLES

Figure 1:
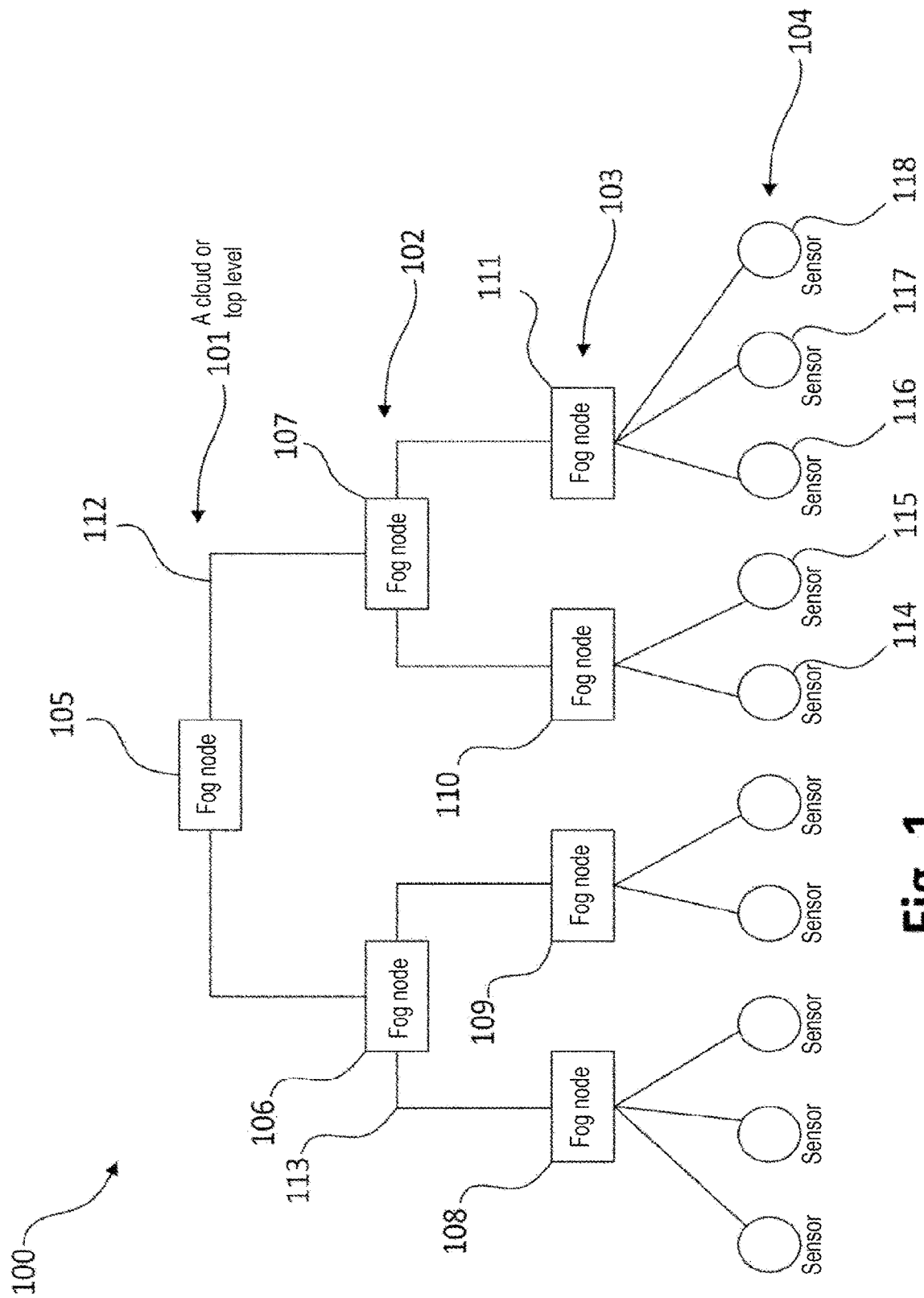
FIG. 1 is a block diagram schematically representing a tree structured fog computing system according to examples.

FIG. 1 is a block diagram schematically representing a tree structured fog computing system 100 according to examples.

As shown in the figure, a tree structured fog computing system 100 according to the present disclosure may comprise a plurality of fog nodes 105-111 at a plurality of fog levels 101-103 including a cloud or top level 101, an edge or bottom level 103, and one or more middle or intermediate levels 102. For the sake of simplicity, only one middle level 102 is shown, but several middle levels are also possible as long as corresponding hierarchical, tree structure is satisfied.

Each of the fog nodes 105-107 at the top and middle fog levels 101, 102 may be parent nodes having children nodes at the level immediately below. In the particular example shown, cloud node 105 at cloud level 101 has two children nodes 106, 107 at the immediately below level (middle level 102), middle node 106 at intermediate level 102 has two children 108, 109 at the immediately below level (edge level 103), etc.

Each of the fog nodes 106-111 at the middle and edge levels 102, 103 may have a parent node at the level immediately above. In the particular example shown, edge nodes 110, 111 have same parent node 107 at the immediately above level (middle level 102), the middle nodes 106, 107 have same parent node 105 at the immediately above level (cloud level 105), etc.

In the particular example illustrated, all parent nodes are shown with two children but it is also possible that parent(s) may have more than two children. Parent nodes and corresponding children nodes may interchange data between them through corresponding connections 112, 113. Nodes at same level may also interchange data between them through suitable connections, which are not shown in the particular example illustrated by FIG. 1.

A sensor level 104 may comprise a plurality of sensors 114-118 that may (continuously and/or regularly) send sensor data to edge nodes 108-111. Each of the edge nodes 108-111 may receive sensor data from said sensors 114-118 that are someway connected with corresponding edge node 108-111. Said connections between sensors 114-118 and edge nodes 108-111 may be wired or wireless. For instance, a wireless connection may be implemented through corresponding wireless emitters at sensor sites and receivers at edge nodes. Wireless receivers at edge nodes may be based e.g. on suitable antenna(s).

In the example shown, edge node 111 may receive sensor data from sensors 116-118; edge node 110 may receive sensor data from sensors 114, 115; etc. Sensors 114-118 may be fixedly or movably distributed over a given territory such as e.g. a country, region, city, etc. The cloud node 105 may be included (or not) in the fog computing system 100.

Figure 2:
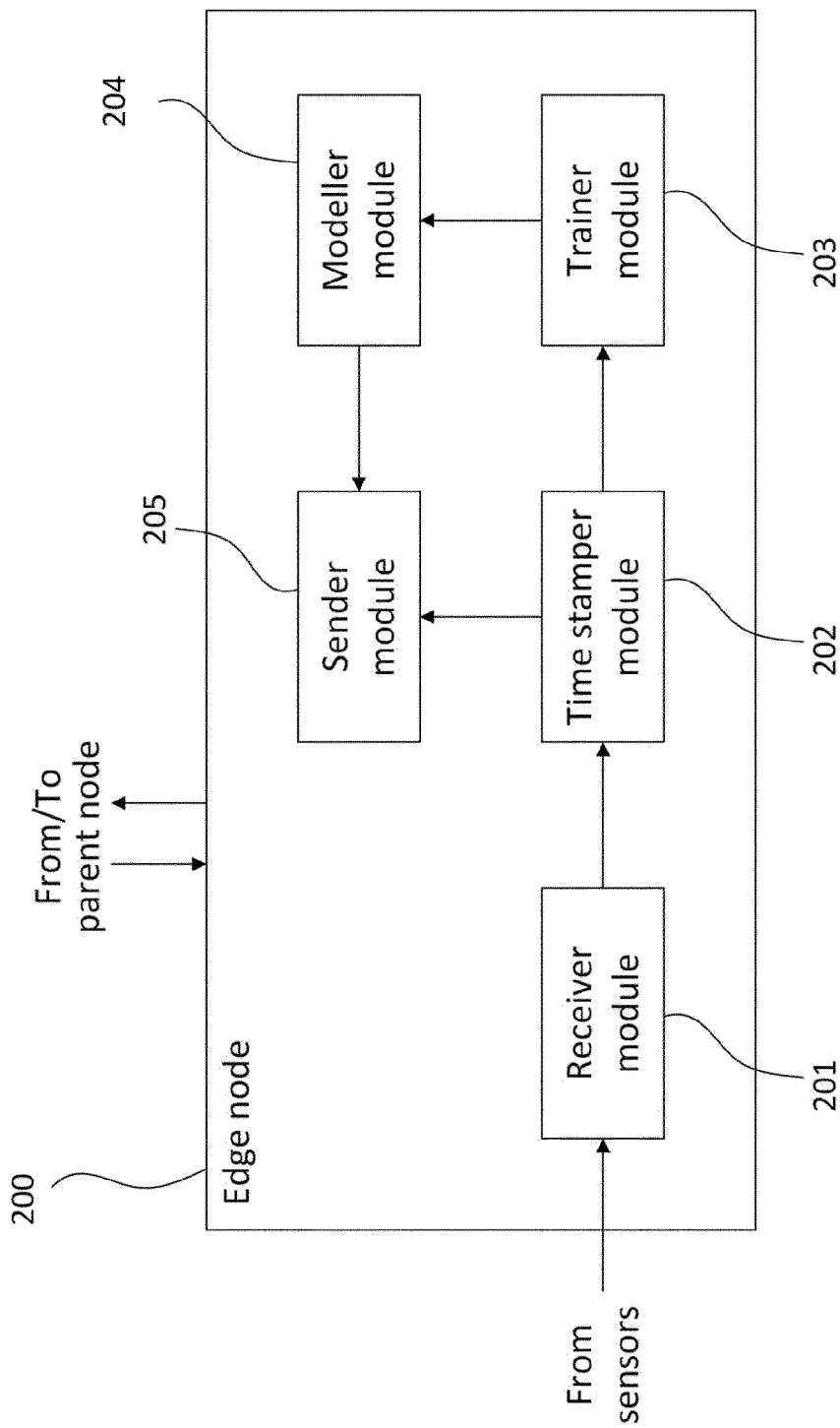
FIG. 2 is a block diagram schematically illustrating an edge node according to examples.

FIG. 2 is a block diagram schematically illustrating an edge node 200 according to examples. As shown in the figure an edge node may comprise different modules, such as e.g. a receiver module 201, a time-stamper module 202, a trainer module 203, a modeller module 204, a sender module 205, etc.

The receiver module 201 may be configured to receive sensor data produced by corresponding sensors. The time-stamper module 202 may assign a reception timestamp to each of the received sensor data indicating when the sensor data has been received. A series of timestamp-ordered sensor data may then be produced according to the reception timestamp(s), by e.g. the time-stamper module 202. The trainer module 203 may be configured to train a first local model through machine learning based on said series of timestamp-ordered sensor data. The sender module 205 may send said series of timestamp-ordered sensor data upwards to the parent node of the edge node 200.

In some examples, the series of timestamp-ordered sensor data may be used, by the modeller module 204, to generate corresponding series of timestamp-ordered modelled data. This may be performed through the first local model trained by the trainer module 203. The sender module 205 may be further configured to send the series of timestamp-ordered modelled data upwards to the parent node of the edge node 200.

According to examples, the receiver module 201 may be further configured to receive a second local model trained at the parent node of the edge node 200 based on series of timestamp-ordered sensor data provided by the edge node 200 to its parent node. Taking this into account, the modeller module 204 may generate series of timestamp-ordered modelled data using either the first local model (locally trained at the edge node 200) or the second local model (trained at the parent of the edge node 200).

This feature(s) may be especially advantageous in case of overload of the edge node 200 when training the first local model so that an incomplete or inefficient training may result. In this situation, the edge node 200 may alternatively use the second local model trained at the parent node (i.e. a middle or cloud node) to generate corresponding modelled data with higher quality than if it were generated using the "incompletely trained" first local model. This situation described with reference to an edge node 200 and its parent (middle) node may also occur between parent and children nodes both at middle level(s).

The first and second local models may be prediction models and, hence, the modelled data produced from said first local model and/or said second local model may be prediction data corresponding to a predefined local area. This predefined local area may be an area covered by the sensors that have produced the sensor data used to produce series of timestamp-ordered sensor data that has been used to train said first local model and/or said second local model.

For example, the sensors from which the edge nodes 200 receive sensor data may comprise vehicle sensors installed at vehicles circulating within the predefined local area. In this case, the sensor data may comprise a presence indicator denoting presence of a vehicle within the predefined local area, and speed data representing a speed at which a vehicle is circulating within the predefined local area. A fog computing system, such as the one of FIG. 1, may be a traffic prediction system wherein each of the edge nodes covers corresponding predefined local area, and all the predefined local areas cover a predefined global area over which the fog computing system may generate prediction (traffic) data.

The sender module 205 may be further configured to send the first local model trained at the trainer module 203 upwards to the parent (middle) node of the edge node 200. A benefit of this feature is that, in case of overload at the parent (middle) node and consequent incomplete training, the parent (middle) node may use (up-to-date) first local models from its children (edge) nodes 200 to produce more reliable results than with its incompletely trained (prediction) model.

The receiver module 201 may be further configured to detect when a restart condition including reception of a maximum number of sensor data is satisfied. Upon satisfaction of said restart condition, the time-stamper module 202 may produce corresponding series of timestamp-ordered sensor data including all the sensor data received and timestamped at the edge node 200, and the sender module 205 may send said series upwards to the parent node of the edge node 200. Satisfaction of the restart condition may also cause production of a restart request to the other edge nodes in the fog computing system. The restart request may be produced by e.g. the receiver module 201 or the time-stamper module 202. Once produced, the restart request may be sent to the other edge nodes by e.g. the sender module 205.

The restart request may provoke at each of the other edge nodes the production of its series of timestamp-ordered sensor data from the sensor data received and timestamped at the other edge node, and the sending of said series upwards to the parent node of the other edge node. At each of the other edge nodes, the production of its series of timestamp-ordered sensor data may be performed by e.g. corresponding time-stamper module included in the other edge node. At each of the other edge nodes, the sending of the produced series may be performed by e.g. corresponding sender module included in the other edge node.

Satisfaction of the restart condition may be seen as an indicator that one of the edge nodes (in the fog computing system) has received the maximum number of sensor data, irrespective of whether the other edge nodes have reached said maximum. Upon satisfaction of the restart condition, all the edge nodes are requested to transmit upwards corresponding series including the sensor data received and timestamped at the edge node so far, i.e. till when the restart condition has been satisfied. An aspect of this feature is that all the edge nodes send corresponding series to respective parent node(s) in a synchronized manner, in order to provoke that all the upwardly transferred sensor data to parent node(s) lies within a common time window for all the edge nodes. This time window based synchronization may permit a more time-coherent training of corresponding (prediction) models at parent nodes, as well as producing more accurate/reliable modelled (prediction) data through said trained models.

The detection of when the restart condition is "locally" satisfied may be performed (at e.g. the receiver module 201) by storing each of the received sensor data in a buffer in reception time order, and causing satisfaction of the restart condition when the buffer is full of received sensor data. The buffer may be (pre-) sized according to the maximum number of sensor data, i.e. it may be configured to store just the maximum number of sensor data. The buffer may be initially emptied, i.e. it may be emptied (just) before the start of each cycle of sensor data reception. The operation of an edge node may be seen as comprising a plurality of reception cycles each one including receiving sensor data and storing it in the buffer which has been initially emptied before the start of the reception cycle. Each of the reception cycles may thus include at a final or almost final stage emptying the buffer as a pre-requirement for starting the next reception cycle.

The satisfaction of the restart condition may also provoke the detection, for each of the other edge nodes in the fog computing system, whether a connection between the other edge node and the parent node of said other edge node is broken or disabled. In case of broken or disabled connection, a connection state of the other edge node may be changed from connected state to disconnected state. This may be performed by e.g. the receiver module 201. Said connection state may correspond to a field accessible at the level of the whole fog computing system denoting whether a given edge node is connected to or disconnected from its parent node. A different connection state field may exist in the fog computing system for each of the edge nodes. As explained in other parts of the description, this characteristic may contribute to improve the abovementioned synchronization of the sending upwards performed by the edge nodes.

The satisfaction of the restart condition may provoke the updating (by e.g. the receiver module 201) of a global edge-timestamp of the fog computing system with a timestamp corresponding to when the edge node 200 has reached the maximum number of received sensor data. Said global edge-timestamp may correspond to a field accessible at the level of the whole fog computing system denoting when all the edge nodes in the fog computing system have been requested to upwardly send to parent node(s) corresponding series. As explained in other parts of the description, this feature may also contribute to improve the aforementioned synchronization of the upwardly sending of series performed by the edge nodes.

The receiver module 201 may be further configured to detect when an "external" restart request is received from one of the other edge nodes in the fog computing system. This "external" restart request may be seen as an indicator that one of the other nodes (in the fog computing system) has reached the maximum number of received sensor data. The reception of the "external" restart request may provoke the time stamper module 202 to produce corresponding series of timestamp-ordered sensor data from the sensor data received and timestamped by the edge node 200. Once the series has been produced, the sender module 205 may proceed to send said produced series upwards to the parent node of the edge node 200.

The reception of sensor data at a given edge node 200 may thus be interrupted either when a restart condition is locally satisfied (because the edge node 200 has reached the maximum number of received sensor data), or when an "external" restart condition is received at the edge node 200 from one of the other edge nodes in the fog computing system (because said other edge has reached the maximum number of received sensor data). After or while the received sensor data is being processed to generate and upwardly send corresponding series, a new cycle of sensor data reception may be initiated as described in other parts of the disclosure.

The production, by e.g. the time stamper module 202, of the series of timestamp-ordered sensor data upon reception of the "external" restart request may comprise detecting whether a connection state (field) of the edge node 200 denotes connected state, in which case the series of timestamp-ordered sensor data may be produced including all the sensor data received and timestamped at the edge node 200. In other words, if the edge node 200 has not lost its connection to its parent node, it is assumed that the series to be upwardly sent will be received by the parent node according to the aforementioned time window which is common to all the edge nodes in the fog computing system. This may additionally improve the training and production of modelled data at the parent node(s) because the ordered sensor data to be used for that falls within the common time window.

The production, by e.g. the time stamper module 202, of the series of timestamp-ordered sensor data upon reception of the "external" restart request may comprise detecting whether a connection state (field) of the edge node 200 denotes disconnected state, in which case the series of timestamp-ordered sensor data may be produced including only the sensor data received and timestamped at the edge node 200 that have a reception timestamp less or equal to a global edge-timestamp of the fog computing system. This global edge-timestamp corresponds to when the other edge node that has produced the "external" restart request has reached the maximum number of received sensor data. In other words, in the case that the edge node 200 has lost its connection with its parent node, only the ordered sensor data within the common time window may be upwardly sent, thereby ensuring a time-coherent training and production of modelled data at the parent node(s).

The production, by e.g. the time stamper module 202, of the series of timestamp-ordered sensor data upon reception of the "external" restart request may further comprise including in the series of timestamp-ordered sensor data the received and timestamped sensor data that is outside the common time window. In other words, the sensor data received and timestamped at the edge node 200 that has a reception timestamp greater than the global edge-timestamp of the fog computing system may also be included in the series of timestamp-ordered sensor data, but with an indicator denoting that said sensor data has been received by the edge node 200 after when the other edge node that has produced the "external" restart request has reached the maximum number of received sensor data. This data outside the common time window may be discarded at the parent node(s) in order to avoid time incoherencies in corresponding training and production of modelled (prediction) data, or may be accepted in less time dependent training and modelling. This data outside the common time window may be simply transferred through the middle levels (of the fog computing system) to the cloud where said "out-of-time" data may be used in cloud centric processes less time sensitive or even time insensitive.

Figure 3:
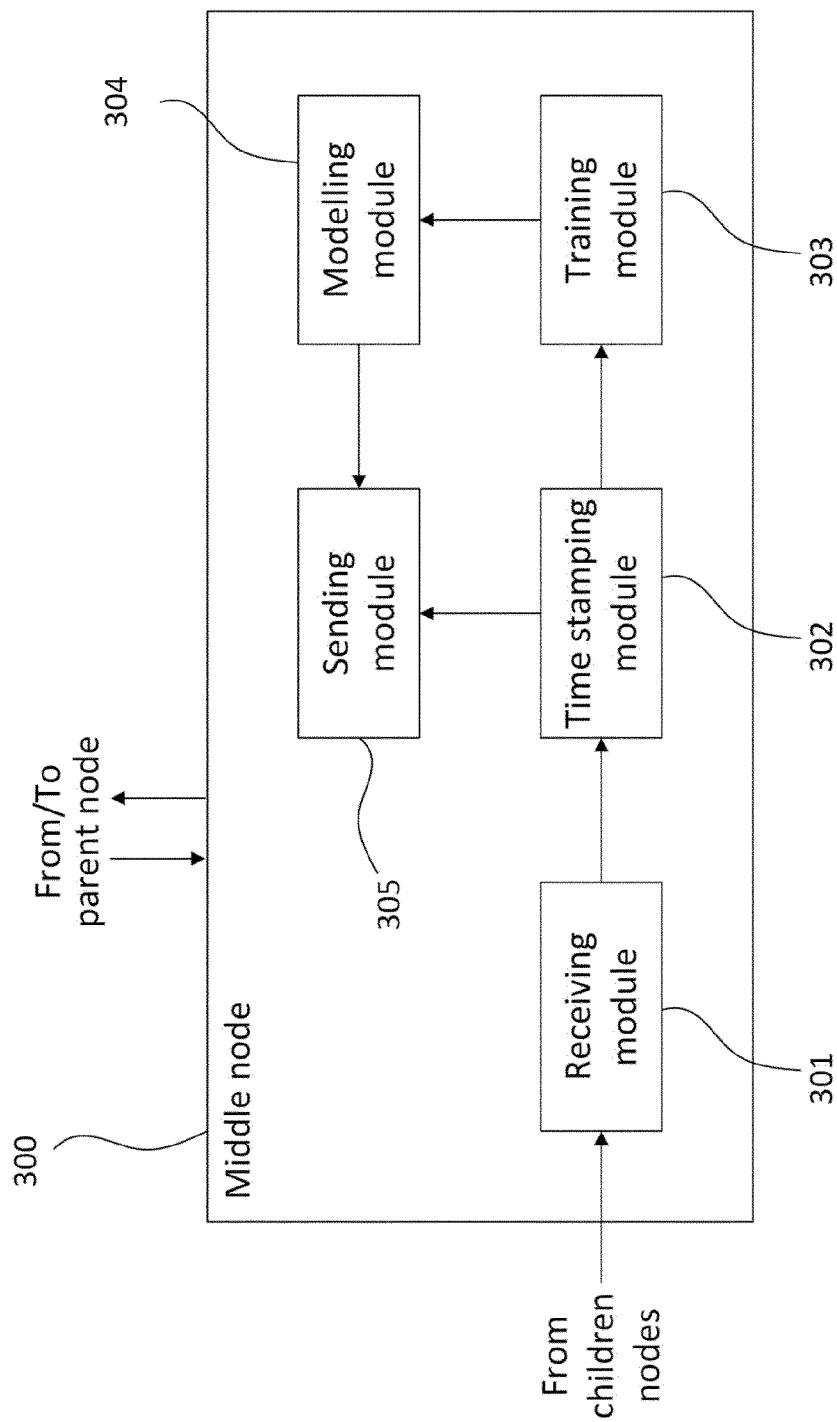
FIG. 3 is a block diagram schematically illustrating a middle node according to examples.

FIG. 3 is a block diagram schematically illustrating a middle node 300 according to examples. As illustrated in the figure, a middle node may comprise different modules, such as e.g. a receiving module 301, a time-stamping module 302, a training module 303, a modelling module 304, a sending module 205, etc.

The receiving module 301 may be configured to collect (or receive) series of timestamp-ordered sensor data from children nodes of the middle node 300. The training module 303 may be configured to train a first supra-local model through machine learning based on the collected series of timestamp-ordered sensor data. The sending module 305 may be configured to send the collected series of timestamp-ordered sensor data upwards to the parent node of the middle node 300.

In certain examples, the time-stamping module 302 may be configured to assign a collection timestamp to each of the collected series of timestamp-ordered sensor data, indicating when the series has been collected by the middle node 300. As explained in other parts of the description, this collection timestamp may be used to synchronize any upwards sending(s) from all the middle nodes 300 at same middle level to parent node(s) of the middle nodes 300.

In some implementations, the collected series of timestamp-ordered sensor data may be used, by the modelling module 304, to generate corresponding series of timestamp-ordered modelled supra-local data. This may be performed through the first supra-local model trained by the training module 303. The sending module 305 may be further configured to send the series of timestamp-ordered modelled supra-local data upwards to the parent node of the middle node 300.

According to examples, the receiving module 301 may be further configured to collect (or receive) a second supra-local model trained at the parent node of the middle node 300 based on series of timestamp-ordered sensor data provided by the middle node 300 to its parent node. Taking this into account, the modelling module 304 may generate series of timestamp-ordered modelled supra-local data using either the first supra-local model (trained at the middle node 300) or the second supra-local model (trained at the parent of the middle node 300). Generally speaking, a redundancy approach may be implemented in the sense that redundant trainings are performed at different nodes so that, in case of incomplete training at a particular node, a "backup" model trained at another node may be used by said particular node to produce modelled data more accurately.

This feature(s) may be especially advantageous in case of overload of the middle node 300 when training the first supra-local model, so that an incomplete or inefficient training may result. In this situation, the middle node 300 may alternatively use the second supra-local model trained at its parent node (which may be another middle node or the cloud node) to generate corresponding modelled supra-local data with higher quality than if it were generated using an "incompletely trained" first supra-local model.

The first and second supra-local models may be prediction models and, hence, the modelled supra-local data produced from said first supra-local model and/or said second supra-local model may be prediction data corresponding to a predefined supra-local area. This predefined supra-local area may be an area encompassing various supra-local areas and/or local areas covered by middle nodes and/or edge nodes at below levels in corresponding fog computing system.

The sending module 305 may be further configured to send the first supra-local model trained at the training module 303 upwards to the parent node of the middle node 300 and/or downwards to the children nodes of the middle node 300. An advantage of this feature is that, in case of overloaded parent and/or children nodes and subsequent incomplete training, the parent and/or children nodes may use (up-to-date) first supra-local models from the middle node 300 to produce more accurate results than with its incompletely trained (prediction) model.

The receiving module 301 may be further configured to detect when a restart condition including collection of a maximum number of series of timestamp-ordered sensor data is satisfied. Upon satisfaction of said restart condition, the sending module 305 may upwardly send the series of timestamp-ordered sensor data collected and timestamped (by e.g. the time-stamping module 302) to the parent node of the middle node 300. As described in other parts of the description, the collected series of timestamp-ordered sensor data may be timestamped with a collection timestamp. Satisfaction of the restart condition may also cause production of a restart request to the other middle nodes in same middle level of the fog computing system. The restart request may be produced by e.g. the receiving module 301 or the time-stamping module 302. Once produced, the restart request may be sent to the other middle nodes in same middle level by e.g. the sending module 305.

The restart request may provoke at each of the other middle nodes (in same middle level) the sending of corresponding series of timestamp-ordered sensor data collected and timestamped at the other middle node upwards to the parent node of the other middle node. At each of the other middle nodes in same middle level, the sending of corresponding series that have been collected and timestamped at the other middle node may be performed by e.g. corresponding sending module included in the other middle node.

Satisfaction of the restart condition may be seen as an indicator that one of the middle nodes (in same middle level) has collected the maximum number of series, irrespective of whether the other middle nodes in same middle level have reached said maximum. Upon satisfaction of the restart condition, all the middle nodes are requested to transmit upwards corresponding series collected and timestamped (with collection timestamp) at the middle node so far, i.e. till when the restart condition has been satisfied. An aspect of this feature is that all the middle nodes send corresponding series to respective parent node(s) in a synchronized manner, in order to provoke that all the upwardly transferred series to parent node(s) lies within a common time window for all the middle nodes. This time window based synchronization may permit a more time-coherent training of corresponding (prediction) models at parent nodes, as well as producing more accurate/reliable modelled (prediction) data through said trained models.

The detection of when the restart condition is "locally" satisfied may be performed (at e.g. the receiving module 301) by storing each of the collected series in a buffer in collection time order, and causing satisfaction of the restart condition when the buffer is full of collected series. The buffer may be (pre-) sized according to the maximum number of series, i.e. it may be configured to store just the maximum number of series. The buffer may be initially emptied, i.e. it may be emptied (just) before the start of each cycle of series collection. The operation of a middle node may be seen as comprising a plurality of collection cycles each one including collecting series and storing them in the buffer which has been initially emptied before the start of the collection cycle. Each of the collection cycles may thus include at a final or almost final stage emptying the buffer as a pre-requirement for starting the next collection cycle.

The satisfaction of the restart condition may also provoke the detection, for each of the other middle nodes in same middle level, whether a connection between the other middle node and the parent node of said other middle node is broken or disabled. In case of broken or disabled connection, a connection state of the other middle node may be changed from connected state to disconnected state. This may be performed by e.g. the receiving module 301. Said connection state may correspond to a field accessible at the level of the whole fog computing system denoting whether a given middle node (in same middle level) is connected to or disconnected from its parent node. A different connection state field may exist in the fog computing system for each of the middle nodes. As explained in other parts of the description, this characteristic may contribute to improve the synchronization of the upwardly sending performed by the middle nodes.

The satisfaction of the restart condition may provoke the updating (by e.g. the receiving module 301) of a global middle-timestamp of the fog computing system with a timestamp corresponding to when the middle node 300 has reached the maximum number of collected series. Said global middle-timestamp may correspond to a field accessible at the level of the whole fog computing system denoting when all the middle nodes in same middle level have been requested to upwardly send corresponding series to parent node(s). As explained in other parts of the description, this feature may also contribute to improve the aforementioned synchronization of the upwardly sending of series performed by the middle nodes.

The receiving module 301 may be further configured to detect when an "external" restart request is received from one of the other middle nodes in same middle level. This "external" restart request may be seen as an indicator that one of the other middle nodes (in same middle level) has reached the maximum number of collected series. The reception of the "external" restart request may provoke the sending module 305 to upwardly send the series collected and timestamped at the middle node 300 to the parent node of the middle node 300.

The collection of series at a given middle node 300 may thus be interrupted either when a restart condition is locally satisfied (because the middle node 300 has reached the maximum number of collected series), or when an "external" restart condition is received at the middle node 300 from one of the other middle nodes in same middle level (because said other middle node has reached the maximum number of collected series). After or while the collected series are being processed to upwardly send said series, a new cycle of series collection may be initiated as described in other parts of the disclosure.

The upwardly sending of the series (collected and timestamped at the middle node 300) upon reception of the "external" restart request may comprise detecting whether a connection state (field) of the middle node 300 denotes connected state, in which case all the series collected and timestamped at the middle node 300 may be upwardly sent. In other words, if the middle node 300 has not lost its connection to its parent node, it is assumed that the series to be upwardly sent will be received by the parent node according to the aforementioned time window which is common to all the middle nodes in same middle level. This may additionally improve the training and production of modelled data at the parent node(s) because the series to be used for that have been collected within the common time window.

The upwardly sending of the series (collected and timestamped at the middle node 300) upon reception of the "external" restart request may comprise detecting whether a connection state (field) of the middle node 300 denotes disconnected state, in which case only the series collected and timestamped at the middle node 300 that have collection timestamp less or equal to a global middle-timestamp of the fog computing system may be upwardly sent. This global middle-timestamp may correspond to when the other middle node that has produced the "external" restart request has reached the maximum number of collected series. In other words, in the case that the middle node 300 has lost its connection with its parent node, only the series (collected and timestamped at the middle node 300) with collection timestamp inside the common time window may be upwardly sent, thereby ensuring a time-coherent training and production of modelled data at the parent node(s).

The upwardly sending of the series (collected and timestamped at the middle node 300) upon reception of the "external" restart request may further comprise upwardly sending the series with collection timestamp outside the common time window. In other words, the series collected and timestamped at the middle node 300 that have collection timestamp greater than the global middle-timestamp (of the fog computing system) may also be upwardly sent, but with an indicator denoting that said series have been collected at the middle node 300 after when the other middle node that has produced the "external" restart request has reached the maximum number of collected series. These series that have been collected outside the common time window may be discarded at the parent node(s) in order to avoid time incoherencies in pertinent training and production of modelled (prediction) data, or may be accepted in less time dependent training and modelling. These series outside common time window may be simply transferred through above middle levels (of the fog computing system) to the cloud where said "out-of-time" series may be used in cloud centric processes that are less time sensitive or time insensitive.

A fog computing system such as the one of FIG. 1 may be a traffic prediction system comprising edge nodes according to e.g. FIG. 2 and middle nodes according to e.g. FIG. 3. Each of the edge nodes may cover a predefined local area, and all the predefined local areas may cover a predefined global area over which the fog computing system may generate prediction (traffic) data. Each of the middle nodes may cover a predefined supra-local area encompassing various supra-local areas and/or local areas covered by middle nodes and/or edge nodes at below levels in the fog computing system.

The term "module" as used herein, with reference to e.g. FIGS. 2 and 3, may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (associated to corresponding edge/middle node) instead of or in addition to the function performed at the described particular module.

Moreover, the modules may be implemented across multiple devices (associated to corresponding edge/middle node) and/or other components local or remote to one another. Additionally, the modules may be moved from one device and added to another device, and/or may be included in both devices (associated to corresponding edge/middle node). Any software implementations may be tangibly embodied in one or more storage media, such as, for example, a memory device, a floppy disk, a compact disk (CD), a digital versatile disk (DVD), or other devices that may store computer code.

Systems and/or computing systems at corresponding edge/middle node(s) according to the present disclosure may be implemented by computing means, electronic means or a combination thereof. The computing means may be a set of instructions (that is, a computer program) and then the authentication (computing) system may comprise a memory and a processor, embodying said set of instructions stored in the memory and executable by the processor. The instructions may comprise functionality to execute methods according to the present disclosure.

In case the authentication (computing) system is implemented only by electronic means, the controller may be, for example, a CPLD (Complex Programmable Logic Device), an FPGA (Field Programmable Gate Array) or an ASIC (Application-Specific Integrated Circuit).

In case the systems and/or computing systems are a combination of electronic and computing means, the computing means may be a set of instructions (e.g. a computer program) and the electronic means may be any electronic circuit capable of implementing the corresponding method steps of the proposed methods.

The computer program may be embodied on a storage medium (for example, a CD-ROM, a DVD, a USB drive, a computer memory or a read-only memory) or carried on a carrier signal (for example, on an electrical or optical carrier signal).

The computer program may be in the form of source code, object code, a code middle source and object code such as in partially compiled form, or in any other form suitable for use in the implementation of methods according to present disclosure. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant methods.

A middle node according to present disclosure (such as e.g. the one of FIG. 3) and several edge nodes according to present disclosure (such as e.g. the one of FIG. 2) may form a parent-children structure usable (or included) in a fog computing system according to present disclosure (such as e.g. the one of FIG. 1). A fog computing system may thus include a diversity of such parent-children structures. For example, the fog computing structure of FIG. 1 comprises two parent-children structures, a first one formed by middle node 106 (parent) and edge nodes 108, 109 (children) and a second one formed by middle node 107 (parent) and edge nodes 110, 111 (children).

Figure 4:
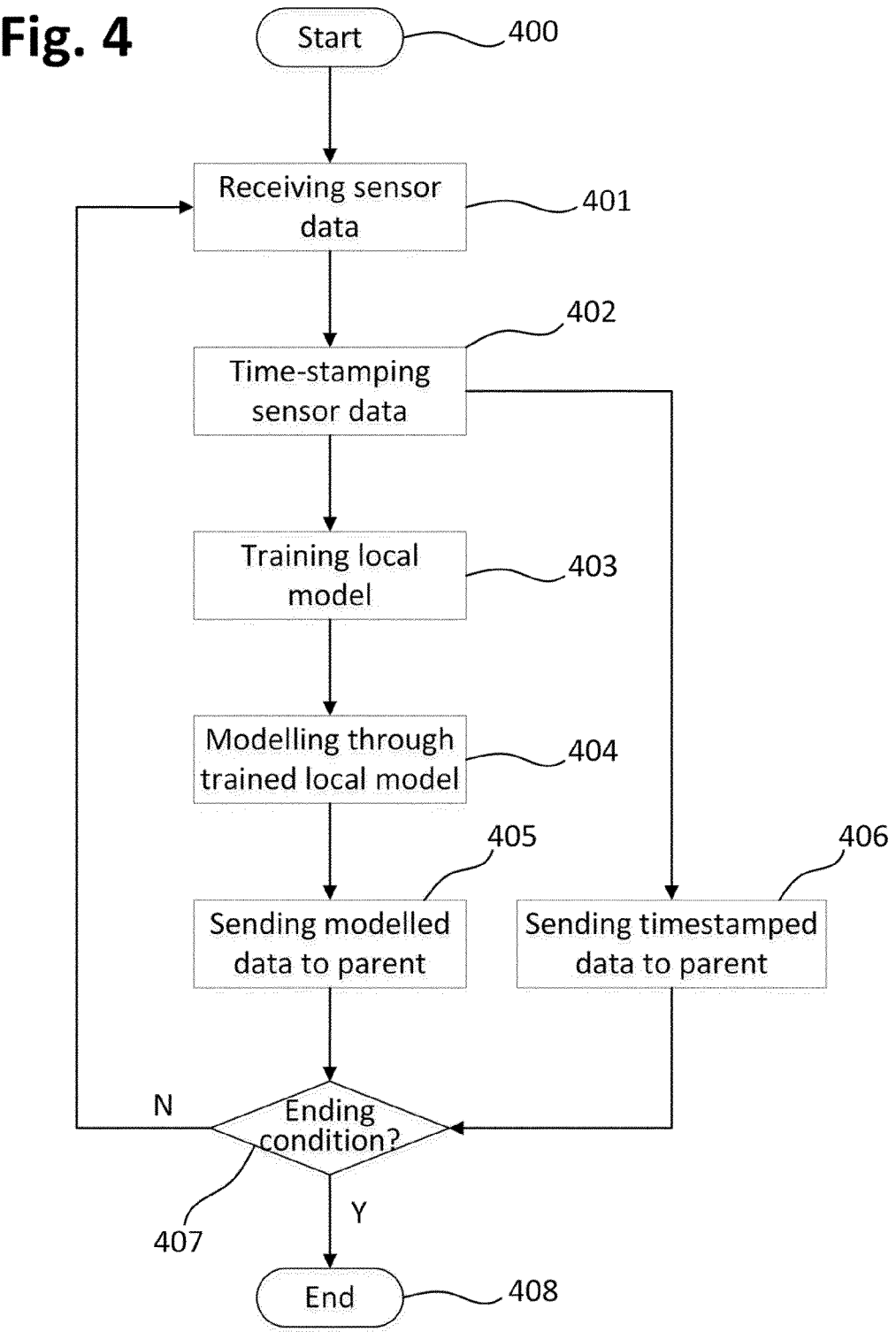
FIG. 4 is a flow chart schematically illustrating a method of operation of an edge node according to examples.

FIG. 4 is a flow chart schematically illustrating a method of operation of an edge node such as e.g. the one shown in FIG. 2. For the sake of better understanding, number references from previous figures may be re-used in the following description of FIG. 4.

At initial block 400, the method of operation of an edge node may be initiated as a result of (detecting) a starting condition such as e.g. activation of the edge node, start of the reception of corresponding stream of data, establishment of communications with sensors, etc.

At block 401, sensor data produced by sensors may be received by the edge node. This reception of sensor data may be performed by e.g. the receiver module 201 of FIG. 2. Same or similar functional principles commented with respect to said receiver module 201 may be taken into account for block 401.

At block 402, a reception timestamp may be assigned to each of the received sensor data indicating when the sensor data has been received, thereby producing corresponding series of timestamp-ordered sensor data. This timestamping and "serialization" of sensor data may be performed by e.g. the time-stamper module 202 of FIG. 2. Same or similar functional features attributed to said time-stamper module 202 may be regarded in the case of block 402.

At block 403, a first local model may be trained (by the edge node) through machine learning based on the produced series of timestamp-ordered sensor data. This training functionality may be performed by e.g. the trainer module 203 of FIG. 2. Same or similar functional aspects described in relation to said trainer module 203 may be considered for block 403.

At block 404, modelled local data may be produced (by the edge node) using the first local model trained at the edge node. This modelling functionality may be performed by e.g. the modeller module 204 of FIG. 2. Same or similar functional principles described regarding said modeller module 204 may be taken into account for block 404.

At block 405, the modelled local data (produced at block 404) may be sent upwards to the parent node of the edge node. At block 406, the series of timestamp-ordered sensor data (produced at block 402) may be sent upwards to the parent node of the edge node. This sending functionality (of blocks 405, 406) may be performed by e.g. the sender module 205 of FIG. 2. Same or similar functional aspects described regarding said sender module 205 may be considered for blocks 405, 406.

At block 407, a verification of whether an ending condition is satisfied may be performed. This ending condition may include e.g. deactivation of the edge node, no reception of "streamed" data during predefined time interval, loss of communications with sensors during predefined time period, etc. In case of positive or true result "Y" of said verification, the method may continue to block 408 for ending its execution and, otherwise "N", the method may loopback to block 401 for starting a new cycle/iteration of the method.

FIG. 5 is a flow chart schematically illustrating a method of operation of a middle node according to examples, such as e.g. the one shown in FIG. 3. For the sake of better understanding, number references from previous figures may be re-used in the following description of FIG. 5.

At initial block 500, the method of operation of a middle node may be initiated as a result of (detecting) a starting condition such as e.g. the activation of the middle node, the start of the reception of corresponding stream of data, establishment of communications with other nodes, etc.

At block 501, series of timestamp-ordered sensor data (from children nodes of the middle node) may be collected by the middle node. This collection of such series may be performed by e.g. the receiving module 301 of FIG. 3. Same or similar functional features commented in relation with said receiving module 301 may be considered for block 401.

At block 502, a collection timestamp may be assigned to each of the collected series of timestamp-ordered sensor data (from children nodes), said collection timestamp indicating when the series has been collected by the middle node. This timestamping of such collected series may be performed by e.g. the time-stamping module 302 of FIG. 3. Same or similar functional characteristics attributed to said time-stamping module 302 may be regarded in the case of block 502.

At block 503, a first supra-local model may be trained (by the middle node) through machine learning based on the collected series of timestamp-ordered sensor data. This training functionality may be performed by e.g. the training module 303 of FIG. 3. Same or similar functional aspects described in relation to said training module 303 may be considered for this block 503.

At block 504, modelled supra-local data may be produced (by the middle node) using the first supra-local model trained at the middle node. This modelling functionality may be performed by e.g. the modelling module 304 of FIG. 3. Same or similar functional principles described regarding said modelling module 304 may be taken into account for block 504.

At block 505, the modelled supra-local data (produced at block 504) may be sent upwards to the parent node of the middle node. At block 506, the time-stamped series (from block 502) may be sent upwards to the parent node of the edge node. This sending functionality (of blocks 505, 506) may be performed by e.g. the sending module 305 of FIG. 3. Same or similar functional aspects described regarding said sending module 305 may be considered for these blocks 505, 506.

At block 507, a verification of whether an ending condition is satisfied may be performed. This ending condition may include e.g. deactivation of the middle node, no reception of "serialized" data during predefined time interval, loss of communications with other nodes during predefined time period, etc. In case of positive or true result "Y" of said verification, the method may continue to block 508 for ending its execution and, otherwise "N", the method may loopback to block 501 for starting a new cycle/iteration of the method.

The methods of FIGS. 4 and 5 are shown with blocks performed in a particular order. However, blocks may be executed in other orders different from the ones illustrated in said figures, and even at least some of the blocks may be run at least partially simultaneously. For example, blocks 501 and 502 may be performed at substantially the same time, i.e. received sensor data may be timestamped at receiving time so that reception and timestamping occurs substantially concurrently. The same or similar "concurrency" principles may be applicable to other blocks, such as e.g. the training of block 503 may be continuously performed as sensor data are received and timestamped. Analogous "concurrency" aspects may be considered for the method of operation of a middle node of FIG. 5.

The machine learning performed at any of the cloud node(s), middle nodes and edge nodes may include any machine learning technique(s) permitting on-line training/updating of a (prediction) model based on corresponding data stream as input. In other words, any machine learning technique that permits implementing what may be denominated as stream learning or data stream learning or data stream machine learning may be used. For example, recurrent network(s) and/or neural network(s) and/or adaptive window mechanism(s) may be utilized for that purpose. The recurrent network(s) may include e.g. Recurrent Neural Network(s) (RNN) and/or Long Short-Term Memory (LSTM) unit(s). The neural network(s) may include e.g. Restricted Boltzmann Machine(s) (RBM) and/or Conditional Restricted Boltzmann Machine(s) (CRBM) and/or auto-encoder(s). The adaptive window mechanism(s) may include e.g. Autoregressive Integrated Moving Average (ARIMA) unit(s) and/or exponentially weighted moving average (EWMA) unit(s) and/or Auto-regression(s).

In some configurations according to e.g. any of the figures, a fog computing system 100 may further comprise the cloud node(s) 105 which may be configured to perform same functions as the middle nodes disclosed herein, excepting those functions implying the intervention of a parent of the cloud node. A reason for this exception(s) is simply because the cloud (or top) node 105 does not have any parent node.

In any of the described fog computing systems 100, not only local and supra-local models may be created and updated through suitable (machine learning based) training, but also data aggregations may be performed from series of timestamp-ordered sensor data created/received at the different levels 101-103 of the system 100. Such aggregations may produce series of timestamp-ordered aggregated data similarly as local and supra-local models may generate series of timestamp-ordered modelled (or prediction) data. Such aggregated data may include e.g. mean values, maximum values, minimum values, average values, etc. within a given elapsed time interval. Such modelled (prediction) data may include e.g. future mean values, future maximum values, future minimum values, future average values, etc. within a given upcoming time interval. Prediction models trained at the fog nodes may further use aggregated data (or not) to generate modelled (prediction) data.

Any known technique may be used to perform such a modelling and aggregation of data to generate series of time-stamp ordered modelled/prediction data and series of time-stamp ordered aggregated data. For example, known aggregation algorithms with or without sliding window may be employed. Any of said generated series may be transmitted upwards in the system 100 in same or similar manner as the series of timestamp-ordered sensor data are propagated from edge nodes 108-111 to cloud node 105. Any of the methods of operation of a middle, edge node disclosed herein may be further configured to process and transmit series of time-stamp ordered aggregated, modelled data in same or similar way as the series of time-stamp ordered sensor data are propagated upwards.

Fog computing systems and involved elements such as edge nodes, middle nodes, etc. may be used to implement different applications in the context of e.g. smart cities. In this sense, several practical scenarios and corresponding fog computing applications are described hereinafter. References to figures are included for the sake of better understanding.

In a first practical scenario, prediction of taxi cars availability on city taxi stations may be performed with a fog computing system 100 according to present disclosure. Cities like Barcelona provide available waiting space in city corners and in front of transited buildings, parks, recreation places, etc. The amount of taxi cars fluctuates during the day, and it may be very useful for citizens to retrieve and predict the availability of a free taxi car at a given waiting spot.

The proposed systems/mechanisms 100 may collect, from different reception antennas, the situation of fleet vehicles, aggregating in order this information at edge level 103, middle level 102 and Cloud level 101, to produce models and estimators for indicating users looking for a taxi where a taxi station has free vehicles available at that precise moment, and predict the availability and trend at short/medium term.

Taxis may use GPS devices 114-118 to constantly indicate their position to the nearest antenna and, furthermore, whether they are available or not. The Edge nodes 108-111 may collect the GPS data and produce local prediction models, and may transmit collected data to middle nodes 106, 107 and Cloud node 105, where more general prediction models may be created. Users may access to e.g. an information service on a Cloud web-service or equivalent to consult the taxi availability, or they may connect to the edge nodes 108-111 and/or middle nodes 106, 107 through e.g. Wi-Fi hot-spots or public consultation terminals, in order to consult local availability information and predictions.

The prediction models, created at different levels 101-103, may provide not only models of each waiting station, zone or neighbourhood, but also may provide information to the taxi drivers to know the current and future status of waiting stations in order to balance their availability, thereby preventing overcrowded stations while others are empty and correspondingly adjust the availability to the users demand.

In a second practical scenario, traffic flux in a city may be predicted with different levels of granularity 101-103. As the Fog computing system 100 offers the capability of modelling and aggregating data at different levels 101-103, traffic data aggregations/models may be performed/trained by e.g. street segment, neighbourhood, traffic area and full city. While data aggregation/models may become fuzzier the closer to the Cloud it is, flux of traffic may be predicted for specific street segments with locally fitted information, or predicted for traffic zones including several streets or neighbourhoods, with possibly less precision per street but predicting a wider behaviour. The proposed systems/mechanisms 100 may collect, from different reception antennas, the situation of reporting vehicles, aggregating this information and producing traffic models for forecasting purposes at the edge nodes 108-111, middle nodes 106, 107 and Cloud node 105.

Users and drivers may forecast traffic flux with different granularity levels 101-103 connecting to the Cloud service 105, or connecting to the available edge nodes 108-111 and/or middle nodes 106, 107 through e.g. Wi-Fi hotspots or Internet connection services for cars (or moving vehicles). Also vehicles may use machine-to-machine systems to automatically connect to the nearest edge node 108-111 and ask for traffic predictions and analytics. This information may be used to plan and recommend routes, avoid possible traffic jams, traffic incidences, etc.

In a third practical scenario, advertising may be provided in public spaces according to the population profile around each advertisement display. While offering free services (e.g. free internet connection) to users reporting their position and user profiling, Edge nodes 108-111 may aggregate, model and profile the population around each advertisement display to decide which ad to display. Users may also rate the usefulness of ads in order to provide feedback to the decision maker and add companies. Through forecasting, models may predict the profiles of population around advertisement displays on advance, and change advertisement rates for publishers to show their ad.

The proposed mechanisms/systems 100 may collect, from the different Wi-Fi hotspots 114-118 providing services to the public, profiling data from the users. Edge nodes 108-111 and/or middle nodes 106, 107 may aggregate/model that data to e.g. create a population profile, determine movement flux, forecast such profiles and movements for near/mid-term, etc. While such data is transmitted to the Cloud 105, to decide strategies, edge nodes 108-111 and/or middle nodes 106, 107 may actuate over advertisement displays, according to such modelling and prediction. In case of connection loss, edge nodes 108-111 and/or middle nodes 106, 107 may still use near/mid-term forecasting to estimate the population around advertisement displays, even if no users are connected due to the lack of free provided service. The different aggregation/modelling levels 101-103 allow population to be profiled according to streets, neighbourhoods, population areas, etc. thereby bringing different levels of personalization for advertisements.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A fog computing system comprising a plurality of fog nodes including edge nodes at an edge or bottom level, and middle nodes at one or more middle levels intermediating between the edge nodes and a cloud node at a cloud or top level, wherein
   the cloud and middle nodes are non-bottom level nodes, the middle and edge nodes are non-top level nodes, and said non-bottom and non-top nodes form a hierarchical structure with each of the non-bottom nodes having children nodes at a next lower level, and each of the non-top nodes having a parent node at a next higher level; wherein
   each of the edge nodes is configured to perform the following functions: receiving sensor data produced by sensors, assigning a reception timestamp to each of said sensor data indicating a time of receipt to produce a corresponding series of timestamp-ordered sensor data, training a first local model through a machine learning based on said series of timestamp-ordered sensor data, and sending said series of timestamp-ordered sensor data to the parent node of the edge node; wherein
   each of the middle nodes is configured to perform the following functions: collecting a series of timestamp-ordered sensor data from the children nodes of the middle node to obtain a collected series of timestamp-ordered sensor data, training a first supra-local model through the machine learning based on the collected series of timestamp-ordered sensor data, and sending the collected series of timestamp-ordered sensor data to the parent node of the middle node.

2. The fog computing system according to claim 1, further comprising the cloud node which is configured to perform following functions: collecting series of timestamp-ordered sensor data from the children nodes of the cloud node, and training a global model through the machine learning based on the collected series of timestamp-ordered sensor data.

3. The fog computing system according to claim 1, wherein each of the non-bottom nodes is further configured to train, for each child node in the children nodes of the non-bottom node, a second local or supra-local model of the child node through the machine learning based on the series of timestamp-ordered sensor data received by the non-bottom node from the child node.

4. The fog computing system according to claim 3, wherein each of the non-bottom nodes is further configured to transmit, for each child node in the children nodes of the non-bottom node, the trained second local or supra-local model of the child node to the child node.

5. The fog computing system according to claim 1, wherein each of the edge nodes is further configured to produce modelled local data from the first local model trained at the edge node and/or from the second local model trained at the parent node of the edge node, wherein
   the first and second local models are prediction models and the modelled local data produced from said first local model and/or said second local model are prediction data corresponding to a predefined local area; and wherein
   said predefined local area is an area covered by the sensors that have produced the sensor data used to produce the series of timestamp-ordered sensor data used to train said first local model and/or said second local model.

6. The edge node for the fog computing system according to claim 1, the edge node being configured to receive sensor data produced by the sensors, to assign the reception timestamp to each of said sensor data indicating when sensor data has been received to produce corresponding series of timestamp-ordered sensor data, to train a first local model through the machine learning based on said series of timestamp-ordered sensor data, and to send said series of timestamp-ordered sensor data to a parent node of the edge node.

7. The middle node for the fog computing system according to claim 1, the middle node being configured to collect series of timestamp-ordered sensor data from children nodes of the middle node, to train the first supra-local model through the machine learning based on the collected series of timestamp-ordered sensor data, and to send the collected series of timestamp-ordered sensor data to a parent node of the middle node.

8. The method of operation of the edge node in the fog computing system according to claim 1, the method comprising:
   receiving, by the edge node, sensor data produced by the sensors;
   assigning, by the edge node, the reception timestamp to each of said sensor data indicating when sensor data has been received;

producing, by the edge node, corresponding series of timestamp-ordered sensor data from the timestamped sensor data;

training, by the edge node, a first local model through the machine learning based on said series of timestamp-ordered sensor data; and sending, by the edge node, said series of timestamp-ordered sensor data to the parent node of the edge node.

9. The method according to claim 8, further comprising:

detecting, by the edge node, when a restart condition including reception of a maximum number of sensor data by the edge node is satisfied and, upon satisfaction of said restart condition:

performing, by the edge node, the production of the series of timestamp-ordered sensor data including all the sensor data received and timestamped by the edge node, and the sending of said series to the parent node of the edge node; and producing, by the edge node, a restart request to the other edge nodes in the fog computing system for causing each of the other edge nodes to produce corresponding series of timestamp-ordered sensor data from the sensor data received and timestamped by the other edge node, and to send said series to the parent node of the other edge node.

10. The method according to claim 9, wherein detecting when the restart condition is satisfied comprises:

storing, by the edge node, each of the received sensor data in a buffer in reception time order, wherein the buffer is sized according to the maximum number of sensor data and the buffer has been initially emptied;

identifying when the buffer is full of received sensor data.

11. The method according to claim 9, further comprising, upon satisfaction of the restart condition: updating, by the edge node, a global edge-timestamp of the fog computing system with a timestamp corresponding to when the edge node has reached the maximum number of received sensor data.

12. The method according to claim 9, further comprising:

detecting, by the edge node, when a restart request is received from one of the other edge nodes in the fog computing system and, upon reception of the restart request:

performing, by the edge node, the production of the series of timestamp-ordered sensor data from the sensor data received and timestamped by the edge node, and the sending of said series to the parent node of the edge node.

13. The method according to claim 12, wherein the production, by the edge node, of the series of timestamp-ordered sensor data upon reception of the restart request comprises:

detecting, by the edge node, whether a connection state of the edge node is a connected or disconnected state with respect to its parent node and, upon detection of connected state, producing the series of timestamp-ordered sensor data including all the sensor data received and timestamped by the edge node, or upon detection of disconnected state, producing the series of timestamp-ordered sensor data including only the sensor data received and timestamped by the edge node that have a reception timestamp less or equal to a global edge-timestamp of the fog computing system, wherein said global edge-timestamp corresponds to when the other edge node that has produced the restart request has reached the maximum number of received sensor data.

14. The method according to claim 13, wherein the production, by the edge node, of the series of timestamp-ordered sensor data upon reception of the restart request further comprises:

including, by the edge node, in the series of timestamp-ordered sensor data the sensor data received and timestamped by the edge node that have a reception timestamp greater than the global edge-timestamp of the fog computing system, along with an indicator denoting that said sensor data have been received by the edge node after when the other edge node that has produced the restart request has reached the maximum number of received sensor data.

15. The method of operation of the middle node in a middle level of the fog computing system according to claim 1, further comprising assigning a collection timestamp to each of the collected series of timestamp-ordered sensor data indicating when the series has been collected by the middle node.

16. The method according to claim 15, further comprising:

detecting, by the middle node, when a restart condition including collection of a maximum number of series of timestamp-ordered sensor data is satisfied and, upon satisfaction of said restart condition:

performing, by the middle node, the sending of the series of timestamp-ordered sensor data collected and timestamped by the middle node to the parent node of the middle node; and producing, by the middle node, a restart request to the other middle nodes in the middle level for causing each of said other middle nodes to send corresponding series of timestamp-ordered sensor data collected and timestamped by the other middle node to the parent node of the other middle node.

17. The method according to claim 16, further comprising, upon satisfaction of the restart condition: updating, by the middle node, a global middle-timestamp of the middle level with a timestamp corresponding to when the middle node has reached the maximum number of collected series of timestamp-ordered sensor data.

18. The method according to claim 16, further comprising:

detecting, by the middle node, when a restart request is received from one of the other middle nodes in the middle level and, upon reception of the restart request:

performing, by the middle node, the sending of the series of timestamp-ordered sensor data collected and timestamped by the middle node to the parent node of the middle node.

19. The method according to claim 18, wherein the sending, by the middle node, of the series of timestamp-ordered sensor data upon reception of the restart request comprises:

detecting, by the middle node, whether a connection state of the middle node is a connected or disconnected state with respect to its parent node and, upon detection of said connected state, sending the series of timestamp-ordered sensor data including all the series of timestamp-ordered sensor data collected and timestamped by the middle node, or, upon detection of said disconnected state:

sending the series of timestamp-ordered sensor data including only the series of timestamp-ordered sensor data collected and timestamped by the middle node that have collection timestamp less or equal to a global middle-timestamp of the middle level, wherein said global middle-timestamp corresponds to when the other middle node in the middle level that has produced the restart request has reached the maximum number of collected series of timestamp-ordered sensor data.

20. The method according to claim 19, wherein the sending, by the middle node, of the series of timestamp-ordered sensor data upon reception of the restart request further comprises:

including, by the middle node, in the sending those series of timestamp-ordered sensor data collected and time-stamped by the middle node that have collection time-stamp greater than the global middle-timestamp of the middle level, along with an indicator denoting that said included series of time-stamp-ordered sensor data have been collected by the middle node after when the other middle node in the middle level that has produced the restart request has reached the maximum number of collected series of timestamp-ordered sensor data.

* * * * *